United States Patent
Treuner et al.

[11] 3,875,153
[45] Apr. 1, 1975

[54] THIOVINYL(THIOACETAMIDO) CEPHALOSPORINS

[75] Inventors: Uwe D. Treuner; Hermann Breuer, both of Regensburg, Germany

[73] Assignee: E. R. Squibb & Sons, Inc., Princeton, N.J.

[22] Filed: May 31, 1973

[21] Appl. No.: 365,816

[52] U.S. Cl.......... 260/243 C, 424/246, 260/465 K, 260/465 D
[51] Int. Cl............................................ C07d 99/24
[58] Field of Search ................................ 260/243 C

[56] References Cited
UNITED STATES PATENTS
3,741,962  6/1973  Breuer .......................... 260/243 C

*Primary Examiner*—Nicholas S. Rizzo
*Attorney, Agent, or Firm*—Lawrence S. Levinson; Merle J. Smith

[57] ABSTRACT

New cephalosporin derivatives of the formula

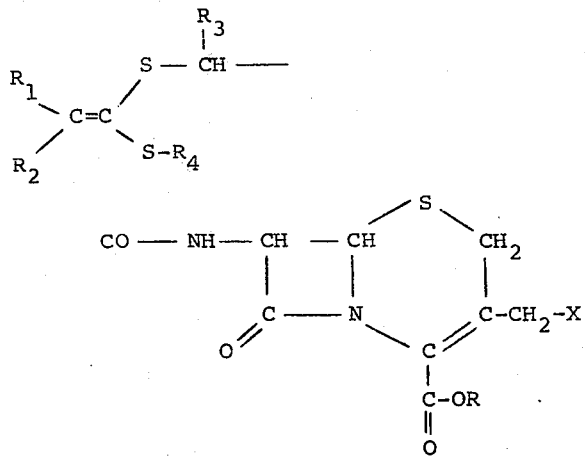

wherein R is hydrogen, lower alkyl, phenyl-lower alkyl, tri(lower alkyl)silyl, alkali metal, alkaline earth metal or amine group or the group

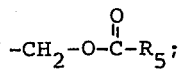

$R_1$ is cyano; $R_2$ is cyano or phenylsulfonyl; $R_3$ is hydrogen, lower alkyl, phenyl or thienyl; $R_4$ is hydrogen or lower alkyl; $R_5$ is lower alkyl, phenyl or phenyl-lower alkyl; and X is hydrogen, hydroxy or lower alkanoyloxy; are useful as antibacterial agents.

10 Claims, No Drawings

3,875,153

THIOVINYL(THIOACETAMIDO) CEPHALOSPORINS

SUMMARY OF THE INVENTION

This invention relates to new cephalosporin derivatives of the formula (I)

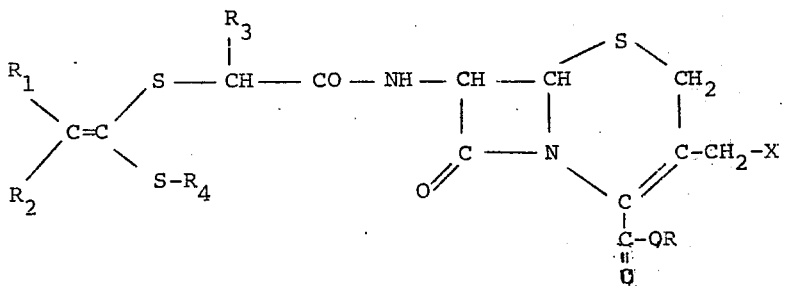

R represents hydrogen, lower alkyl, phenyl-lower alkyl, tri-(lower alkyl)silyl, alkali metal, alkaline earth metal or amine group or the group

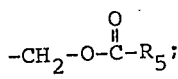

$R_1$ represents cyano; $R_2$ represents cyano or phenylsulfonyl; $R_3$ represents hydrogen, lower alkyl, phenyl or thienyl; $R_4$ is hydrogen or lower alkyl; $R_5$ is lower alkyl, phenyl or phenyl-lower alkyl; and X is hydrogen, hydroxy or lower alkanoyloxy.

The preferred members within each group are as follows: R is hydrogen, alkali metal, trimethylsilyl or

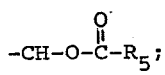

especially hydrogen, pivaloyloxy, sodium or potassium; $R_1$ is cyano; $R_2$ is cyano or phenylsulfonyl; $R_3$ is hydrogen or phenyl; $R_4$ is hydrogen or methyl; $R_5$ is lower alkyl, preferably methyl or t-butyl and X is hydrogen or acetoxy.

DETAILED DESCRIPTION OF THE INVENTION

The various groups represented by the symbols have the meanings defined below and these definitions are retained throughout this specification.

The lower alkyl groups are the one to seven carbon, straight or branched chain, saturated hydrocarbon radicals like methyl, ethyl, propyl, isopropyl, butyl, isobutyl, t-butyl and the like. The one to four carbon members are preferred, especially methyl and ethyl.

The lower alkanoyloxy groups include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like.

The salt forming ions represented by R are the metal ions, alkali metal ions such as sodium or potassium, alkaline earth metal ions such as calcium or magnesium, or an amine salt ion, of which a number are known for this purpose, for example, dibenzylamine, N,N-dibenzylethylenediamine, lower alkylamines like methylamine, triethylamine, N-lower alkylpiperidine like N-ethylpiperidine, etc.

The new cephalosporins of this invention are produced by reacting a 7-aminocephalosporanic acid compound of formula II [which includes 7-aminocephalosporanic acid (7-ACA), 7-amino-3-desacetoxycephalosporanic acid (7-ADCA) and other derivatives] of the formula (II)

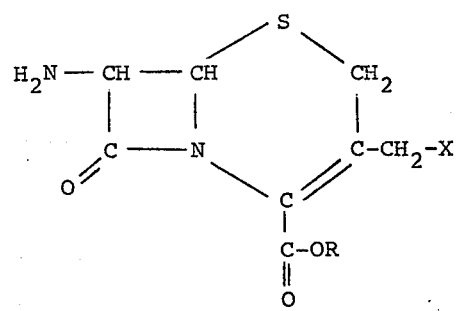

with an acid of the formula (III)

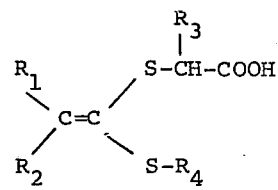

or a reactive derivative of the former (II) by known procedures, e.g., in the presence of dicyclohexylcarbodiimide or utilizing mixed anhydride, activated ester, activated amide or ioxazolium salt derivatives.

The reaction between the 7-aminocephalosporanic acid compound and the acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The product of the reaction is then isolated by conventional procedures, e.g., by concentration or evaporation of the solvent.

As an alternative, a product of formula I is produced by reacting a salt, e.g., an alkali metal salt, of the formula (V)

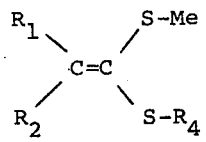

with a compound of the formula (VI)
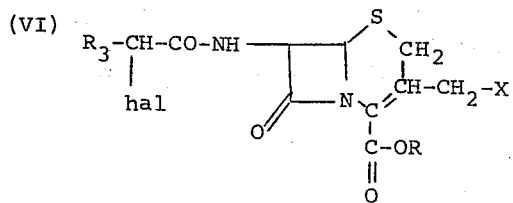

or derivative thereof in a solvent such as dimethylformamide. Me represents a metal, preferably potassium, hal is halogen, preferably chlorine or bromine, and R, $R_3$ and X are the same as above. The compound of formula VI can also be treated with the free mercapto compound, instead of the metal salt, e.g., in methylene chloride in the presence of an organic base like triethylamine.

The starting materials of formulas III and V, when $R_2$ is phenylsulfonyl, are new compounds. They are produced as follows:

Phenylsulfonylacetonitrile is treated with carbon disulfide and an organic derivative of an alkali metal, e.g., potassium tert. butylate, in an organic solvent like dimethylformamide to produce the 2-cyano-2-(phenylsulfonyl)-1,1-ethenedithiol alkali metal salt of the formula (IV)
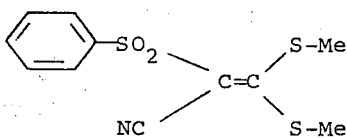

wherein Me is alkali metal.

This product is then alkylated with an alkyl halide like methyl iodide, ethyl iodide or the like to obtain (V)
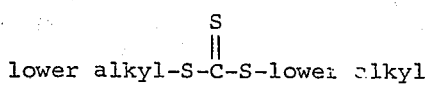

Also, by treating phenylsulfonylacetonitrile with a dialkyl trithiocarbonate of the formula (VI)
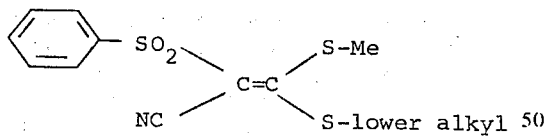

e.g., ethylmethyl trithiocarbonate, with an alkali metal alcoholate like potassium methylate in a solvent like dimethylformamide, the product of formula V is obtained.

The product of formula V upon reaction with a haloacetic acid like α-bromoacetic acid yields a [[2-cyano-1-(lower alkylthio)-2-(phenylsulfonyl)ethenyl]-thio]acetic acid of the formula (VII)
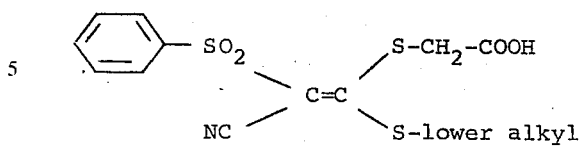

When R is the acyloxymethyl group

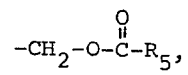

this group may be introduced into the 7-aminocephalosporanic acid moiety prior to the reaction with the acid or the activated derivative by treatment with one to two moles of a halomethyl ester of the formula

(VIII)

wherein hal is halogen, preferably chlorine or bromine, in an inert organic solvent such as dimethylformamide, acetone, dioxane, benzene or the like, at about ambient temperature or below.

Further process details are provided in the illustrative examples.

Certain of the compounds of this invention exist in isomeric forms, e.g., when $R_1$ and $R_2$ are different, cis-trans isomers can form. The various isomeric forms are within the scope of the invention.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1 percent by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

9.05 g. (50mM) of phenylsulfonylacetonitrile are dissolved in 150 ml. of dimethylformamide and 5.4 g. (100mM) of potassium methylate and 30 ml. of carbon disulfide are added. After stirring for two hours, a clear yellow solution is obtained containing 2-cyano-2-(phenylsulfonyl)-1,1-ethenedithiol, dipotassium salt. This is isolated by the addition of ether. Treatment of this product with methyl iodide yields 2-cyano-1-(methylthio)-2-(phenylsulfonyl)-1-ethenethiol, potassium salt.

The same product is obtained by the direct addition of 50 mM of methyl iodide to the solution of the dipotassium salt. This solution is then evaporated to one-third its volume and 300 ml. of water are added. The solution is acidified with hydrochloric acid and the cyano(phenylsulfonyl)-dithioacetic acid is extracted with ethyl acetate. This is treated in ethanol with an equivalent amount of potassium ethylate, then evaporated to dryness to obtain 2-cyano-1-(methylthio)-2-(phenylsulfonyl)-1-ethylenethiol, potassium salt as a yellow powder, m.p. 298°.

EXAMPLE 2

9.05 g. (50mM) of phenylsulfonylacetonitrile and 1.95 g. of potassium are dissolved in 50 ml. of absolute ethanol. 7.6 g. of ethyl methyl trithiocarbonate are added slowly at 0°. After stirring for 2 hours, 2-cyano-1-(methylthio)-2-(phenylsulfonyl)-1-ethenethiol, potassium salt, is precipitated with 30 ml. of ether. Treatment with bromacetic acid yields [[2-cyano-1-(methylthio)-2-(phenylsulfonyl)ethenyl]thio]acetic acid.

EXAMPLE 3

2 g. (5mM) of 7-(α-bromoacetamido)cephalosporanic acid and 0.97 g. (5mM) of 2,2-dicyano-1-(methylthio)-1-ethenethiol, potassium salt, in 20 ml. of dimethylformamide are stirred for 10 minutes at room temperature. Potassium bromide immediately begins to precipitate. The whole mixture is poured into 200 ml. of ice water and this is extracted three times, each with 50 ml. of ethyl acetate. The organic extract is dried over sodium sulfate and the product, 7-[2-[[2,2-dicyano-1-(methylthio)vinyl]thio]acetamido]-3-(hydroxymethyl)-8-oxo-5-thia-1-azabicyclo[4.2.0]oct-2-ene-2-carboxylic acid-3-acetate, is obtained in 72 percent yield after removal of the solvent. The product is crystallized from methylene chloride-carbon tetrachloride, m.p. 66° (dec.).

The following additional products are obtained by the foregoing procedure by substitution of the respective starting materials:

7-[2-[[2,2-dicyano-1-(methylthio)vinyl]thio]acetamido]-3-methyl-8-oxo-5-thia-1-azabicyclo[4.2.0]oct-2-ene-2-carboxylic acid and sodium salt.

7-[2-[[2,2-dicyano-1-(ethylthio)vinyl]thio]-2-phenylacetamido]-3-(hydroxymethyl)-8-oxo-5-thia-1-azabicyclo[4.2.0]oct-2-ene-2-carboxylic acid-3-acetate.

7-[2-[[2,2-dicyano-1-(methylthio)vinyl]thio]-2-phenylacetamido]-3-methyl-8-oxo-5-thia-1-azabicyclo[4.2.0]oct-2-ene-2-carboxylic acid and potassium salt.

7-[2-[(2,2-dicyano-1-thiovinyl)thio]-2-phenylacetamido]-3-(hydroxymethyl)-8-oxo-5-thia-1-azabicyclo-[4.2.0]oct-2-ene-2-carboxylic acid-3-acetate and sodium salt.

7-[2-[[2,2-dicyano-1-(methylthio)vinyl]thio]-2-phenylacetamido]-3-methyl-8-oxo-5-thia-1-azabicyclo[4.2.0]-oct-2-ene-2-carboxylic acid, (pivaloyloxy)methyl ester.

7-[2-[[2,2-dicyano-1-(methylthio)vinyl]thio]acetamido-3-methyl-8-oxo-5-thia-1-azabicyclo[4.2.0]oct-2-ene-2-carboxylic acid, triethylamine salt.

7-[2-[[2,2-dicyano-1-(ethylthio)vinyl]thio]-2-(2-thienyl)acetamido]-3-(hydroxymethyl)-8-oxo-5-thia-1-azabicyclo-[4.2.0]oct-2-ene-2-carboxylic acid-3-acetate and potassium salt.

7-[2-[[2,2-dicyano-1-(methylthio)vinyl]thio]-2-(2-thienyl)acetamido]-3-methyl-8-oxo-5-thia-1-azabicyclo-[4.2.0]oct-2-ene-2-carboxylic acid, trimethylsilyl ester.

7-[2-[[2,2-dicyano-1-(methylthio)vinyl]thio]-2-ethylacetamido]-3-(hydroxymethyl)-8-oxo-5-thia-1-azabicyclo-[4.2.0]oct-2-ene-2-carboxylic acid-3-acetate and potassium salt.

7-[2-[[2,2-dicyano-1-thiovinyl]thio]-2-methylacetamido]-3-methyl-8-oxo-5-thia-1-azabicyclo[4.2.0]oct-2-ene-2-carboxylic acid.

EXAMPLE 4

2.35 ml. (5mM) of 7-(α-bromoacetamido)cephalosporanic acid and 1.67 g. (5mM) of 2-cyano-2-(phenylsulfonyl)-1,1-ethenedithiol, dipotassium salt, are reacted in the same manner as in Example 3. The product is worked up in the same way except that the aqueous phase is acidified to pH 2.5 with 2N hydrochloric acid before extraction. The product, cis-trans 7-[2-[[2-cyano-2-(phenylsulfonyl)-1-thiovinyl]thio]acetamido]-3-(hydroxymethyl)-8-oxo-5-thia-1-azabicyclo[4.2.0]oct-2-ene-2-carboxylic acid-3-acetate, melts at 120° (dec.).

The following additional products are obtained by the foregoing procedure by substitution of the respective starting materials:

7-[2-[[2-cyano-2-(phenylsulfonyl)-1-(methylthio)-vinyl]thio]acetamido]-3-(hydroxymethyl)-8-oxo-5-thia-1-azabicyclo[4.2.0]oct-2-ene-2-carboxylic acid-3-acetate.

7-[2-[[2-cyano-2-(phenylsulfonyl)-1-thiovinyl]thio]acetamido]-3-methyl-8-oxo-5-thia-1-azabicyclo[4.2.0]oct-2-ene-2-carboxylic acid.

7-[2-[[2-cyano-2-(phenylsulfonyl)-1-(methylthio)vinyl]-thio]acetamido]-3-methyl-8-oxo-5-thia-1-azabicyclo[4.2.0]oct-2-ene-2-carboxylic acid and sodium salt.

7-[2-[[2-cyano-2-(phenylsulfonyl)-1-(ethylthio)-vinyl]thio]-2-phenylacetamido]-3-methyl-8-oxo-5-thia-1-azabicyclo[4.2.0]oct-2-ene-2-carboxylic acid and potassium salt.

7-[2-[[2-cyano-2-(phenylsulfonyl)-1-(methylthio)-vinyl]thio]-2-phenylacetamido]-3-(hydroxymethyl)-8-oxo-5-thia-1-azabicyclo[4.2.0]oct-2-ene-2-carboxylic acid-3-acetate.

7-[2-[[2-cyano-2-(phenylsulfonyl)-1-(methylthio)-vinyl]thio]-2-phenylacetamido]-3-methyl-8-oxo-5-thia-1-azabicyclo[4.2.0]oct-2-ene-2-carboxylic acid, acetoxymethyl ester.

7-[2-[[2-cyano-2-(phenylsulfonyl)-1-thiovinyl]-thio]-2-phenylacetamido]-3-methyl-8-oxo-5-thia-1-azabicyclo[4.2.0]oct-2-ene-2-carboxylic acid, triethylamine salt.

7-[2-[[2-cyano-2-(phenylsulfonyl)-1-(methylthio)-vinyl]thio]-2-(2-thienyl)acetamido]-3-methyl-8-oxo-5-thia-1-azabicyclo[4.2.0]oct-2-ene-2-carboxylic acid.

7-[2-[[2-cyano-2-(phenylsulfonyl)-1-(ethylthio)-vinyl]thio]-2-(2-thienyl)acetamido]-3-(hydroxymethyl)-8-oxo-5-thia-1-azabicyclo[4.2.0]oct-2-ene-2-carboxylic acid-3-acetate.

7-[2-[[2-cyano-2-(phenylsulfonyl)-1-(methylthio)-vinyl]thio]-2-ethylacetamido]-3-(hydroxymethyl)-8-oxo-5-thia-1-azabicyclo[4.2.0]oct-2-ene-2-carboxylic acid-3-acetate.

7-[2-[2-cyano-2-(phenylsulfonyl)-1-thiovinyl]-2-methylacetamido]-3-methyl-8-oxo-5-thia-1-azabicyclo[4.2.0]oct-2-ene-2-carboxylic acid and sodium salt.

What is claimed is:

1. A compound of the formula

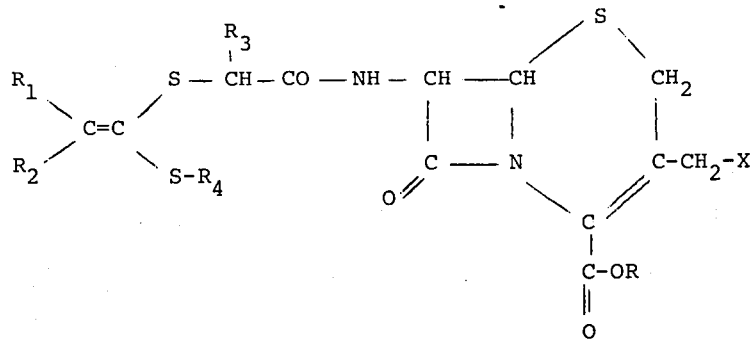

wherein R is hydrogen, lower alkyl, phenyl-lower alkyl, tri(lower alkyl)silyl, alkali metal, alkaline earth metal, dibenzylamine, N,N-dibenzylamine, N,N-dibenzylethylene diamine, lower alkylamine, N-lower alkylpiperidine or the group

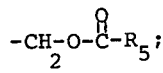

$R_1$ is cyano; $R_2$ is cyano or phenylsulfonyl; $R_3$ is hydrogen, lower alkyl, phenyl or thienyl; $R_4$ is hydrogen or lower alkyl; $R_5$ is lower alkyl, phenyl or phenyl-lower alkyl; and X is hydrogen, hydroxy or lower alkanoyloxy.

2. A compound as in claim 1 wherein R is hydrogen, alkali metal, trimethylsilyl or

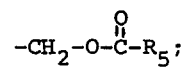

$R_1$ is cyano; $R_2$ is cyano or phenylsulfonyl; $R_3$ is hydrogen or phenyl; $R_4$ is hydrogen or methyl; $R_5$ is lower alkyl and X is hydrogen or acetoxy.

3. A compound as in claim 1 wherein $R_1$ and $R_2$ each is cyano.

4. A compound as in claim 1 wherein $R_1$ is cyano and $R_2$ is phenylsulfonyl.

5. A compound as in claim 1 wherein $R_1$ and $R_2$ each is cyano, R and $R_3$ each is hydrogen, $R_4$ is lower alkyl and X is lower alkanoyloxy.

6. A compound as in claim 5 wherein the lower alkyl group is methyl and the lower alkanoyloxy group is acetoxy.

7. A compound as in claim 1 wherein $R_1$ is cyano, $R_2$ is phenylsulfonyl, R, $R_3$ and $R_4$ each is hydrogen and X is lower alkanoyloxy.

8. A compound as in claim 7 wherein the lower alkanoyloxy group is acetoxy.

9. A compound as in claim 1 wherein $R_1$ is cyano, $R_2$ is phenylsulfonyl, R and $R_3$ each is hydrogen, $R_4$ is lower alkyl and X is lower alkanoyloxy.

10. A compound as in claim 9 wherein the lower alkyl group is methyl and the lower alkanoyloxy group is acetoxy.

* * * * *